United States Patent
Huang

(10) Patent No.: US 11,263,643 B2
(45) Date of Patent: Mar. 1, 2022

(54) COMPUTER-IMPLEMENTED METHOD FOR DETECTING FRAUDULENT TRANSACTIONS USING LOCALITY SENSITIVE HASHING AND LOCALITY OUTLIER FACTOR ALGORITHMS

(71) Applicant: COUPANG CORP., Seoul (KR)

(72) Inventor: Xiaojun Huang, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/552,983

(22) Filed: Aug. 27, 2019

(65) Prior Publication Data

US 2021/0065208 A1  Mar. 4, 2021

(51) Int. Cl.
*G06Q 30/00* (2012.01)
*G06F 16/22* (2019.01)
*G06F 16/23* (2019.01)

(52) U.S. Cl.
CPC ..... *G06Q 30/0185* (2013.01); *G06F 16/2255* (2019.01); *G06F 16/2264* (2019.01); *G06F 16/2365* (2019.01)

(58) Field of Classification Search
None
See application file for complete search history.

(56) References Cited

U.S. PATENT DOCUMENTS

| 8,544,087 | B1 * | 9/2013 | Eskin | G06F 21/552 726/22 |
| 8,655,773 | B1 * | 2/2014 | Fasoli | G06Q 40/00 705/38 |
| 2005/0182712 | A1 | 8/2005 | Angell | |
| 2006/0161592 | A1 * | 7/2006 | Ertoz | G06F 21/552 |

(Continued)

FOREIGN PATENT DOCUMENTS

| CN | 107093076 A | 8/2017 |
| CN | 107977804 A | 5/2018 |

(Continued)

OTHER PUBLICATIONS

Magomedov et al.: "Anomaly Detection with Machine Learning and Graph Databases in Fraud Management", International Journal of Advanced Computer Science and Applications, vol. 9, No. 11, 2018. (Year: 2018).*

(Continued)

*Primary Examiner* — Paul R Fisher
(74) *Attorney, Agent, or Firm* — Finnegan, Henderson, Farabow, Garrett & Dunner LLP

(57) ABSTRACT

Methods and systems for detecting fraudulent data points in a database of a computerized system include receiving, from a user device, a request for detecting one or more fraudulent data points in a database storing data points representing electronic transactions. The system constructs a feature vector fore each data point and k random vectors. After constructions, the system performs a combination of Locality Sensitive Hashing algorithm and Local Outlier Factor (LOF) algorithm on the constructed feature vectors and the constructed k random vectors to compute outlier scores for each data point. The system detects a fraudulent data point based on the outlier scores that indicate consistent degrees.

12 Claims, 15 Drawing Sheets

(56) References Cited

U.S. PATENT DOCUMENTS

| | | | |
|---|---|---|---|
| 2008/0222002 A1* | 9/2008 | Hu | G06Q 40/025 705/38 |
| 2009/0031176 A1 | 1/2009 | Ide et al. | |
| 2011/0022483 A1* | 1/2011 | Hammad | G06Q 20/20 705/17 |
| 2011/0225090 A1* | 9/2011 | Hammad | G06Q 20/405 705/44 |
| 2012/0059779 A1 | 3/2012 | Syed et al. | |
| 2013/0091058 A1* | 4/2013 | Huster | G06Q 20/322 705/44 |
| 2013/0097706 A1* | 4/2013 | Titonis | G06F 21/56 726/24 |
| 2014/0045456 A1* | 2/2014 | Ballai | H04W 12/1206 455/410 |
| 2014/0229307 A1* | 8/2014 | Kallumadi | G06Q 30/0601 705/26.1 |
| 2015/0178866 A1* | 6/2015 | Serio | G06Q 50/163 705/314 |
| 2015/0278817 A1* | 10/2015 | Abifaker | G06Q 20/4016 705/44 |
| 2016/0253672 A1 | 9/2016 | Hunter et al. | |
| 2016/0328654 A1 | 11/2016 | Bauer et al. | |
| 2018/0107971 A1* | 4/2018 | Vukin | G06Q 10/087 |
| 2018/0225391 A1 | 8/2018 | Sali et al. | |
| 2018/0255010 A1 | 9/2018 | Goyal et al. | |
| 2019/0180290 A1* | 6/2019 | Jubete | G06N 20/00 |
| 2019/0236594 A1* | 8/2019 | Ehrlich-Quinn | G06Q 20/065 |
| 2019/0333097 A1* | 10/2019 | Sohum | H04L 63/101 |

FOREIGN PATENT DOCUMENTS

| | | | |
|---|---|---|---|
| CN | 108829656 A | 11/2018 | |
| CN | 109657932 A | 4/2019 | |
| JP | 2007-325293 | 12/2007 | |
| JP | 2017-146951 | 8/2017 | |
| JP | 2017-146951 A | 8/2017 | |
| JP | 2018-169994 | 11/2018 | |
| JP | 2019-067086 | 4/2019 | |
| TW | 201830921 A | 8/2018 | |
| WO | WO 2012/146508 A1 * | 11/2012 | H04L 29/08 |

OTHER PUBLICATIONS

Amer et al.: "Nearest-Neighbor and Clustering based Anomaly Detection Algorithms for RapidMiner", RCOMM2012, Aug. 29, 2012. (Year: 2012).*

Breunig et al.: "LOF: Identifying Density-Based Local Outliers", ACM SIGMOD 2000 Int. Conf. On Management of Data, 2000 (Year: 2000).*

Duan et al.: "Cluster-based outlier detection", Springer Science+ Business Media, Jun. 12, 2008. (Year: 2008).*

Xu et al.: "A Hierarchical Framework Using Approximated Local Outlier Factor for Efficient Anomaly Detection", SciVerse ScienceDirect, 2013. (Year: 2013).*

Akoglu et al. "Graph-based Anomaly Detection and Description: A Survey", Stony Brook University, Apr. 28, 2014. (Year: 2014).*

Bit Calculator, "Understanding the most and least significant bit" (Mar. 26, 2018) https://bit-calculator.com/most-and-least-significant-bit (Year: 2018).*

Ali, S.-H.-A., Ozawa, S., Nakazato, J., Ban, T. and Shimamura, J. (2015) An Online Malicious Spam Email Detection System Using Resource Allocating Network with Locality Sensitive Hashing. Journal of Intelligent Learning Systems and Applications, 7, 42-57. http://dx.doi.org/10.4236/jilsa.2015.72005 (Year: 2015).*

Mira et al., "RODHA: Robust Outlier Detection using Hybrid Approach", American Journal of Intelligent Systems, 2012 (Year: 2012).*

A. Mohan., "Local Outlier Factor", https://medium.com/@arunm8489/local-outlier-factor-13784dc1992a, pp. 1-5, Dec. 31, 2018.

Notice of Preliminary Rejection dated Dec. 4, 2020, by the Korean Patent Office in Korean Application No. 10-2019-0127277, 13 pages.

International Search Report and Written Opinion dated Oct. 21, 2020, in PCT International Application PCT/IB2020/056623, 11 pages.

Markus M. Breunig et al, "LOF: Identifying Density-Based Local Outliers", ACM Sigmod Record, ACM, 2000, vol. 29, No. 2, pp. 93-104, ACM, 2000, 12 pages.

Examination Report dated Dec. 8, 2020, by the Australian Patent Office in Australian Application No. 2020264419, 9 pages.

Notice of Allowance dated May 6, 2021, by the Korean Patent Office in Korean Application No. 10-2019-0127277, 8 pages.

Office Action dated Jul. 20, 2021, by the Taiwanese Patent Office in Taiwanese Application No. 109125076, 23 pages.

Examination Report dated Jul. 29, 2021, by the Hong Kong Patent Office in Hong Kong Application No. 22020012659.1, 9 pages.

JP 2018/169994—A machine-translated abstract of this document is enclosed.

CN 108829656—A machine-translated abstract of this document is enclosed.

CN 109657932—A machine-translated abstract of this document is enclosed.

CN 107977804—A machine-translated abstract of this document is enclosed.

TW 201830921—A machine-translated abstract of this document is enclosed.

CN 107093076—A machine-translated abstract of this document is enclosed.

Notice of Reasons for Rejection dated Nov. 9, 2021, by the Japanese Patent Office in counterpart Japanese Application No. 2020-567840, 14 pages.

* cited by examiner

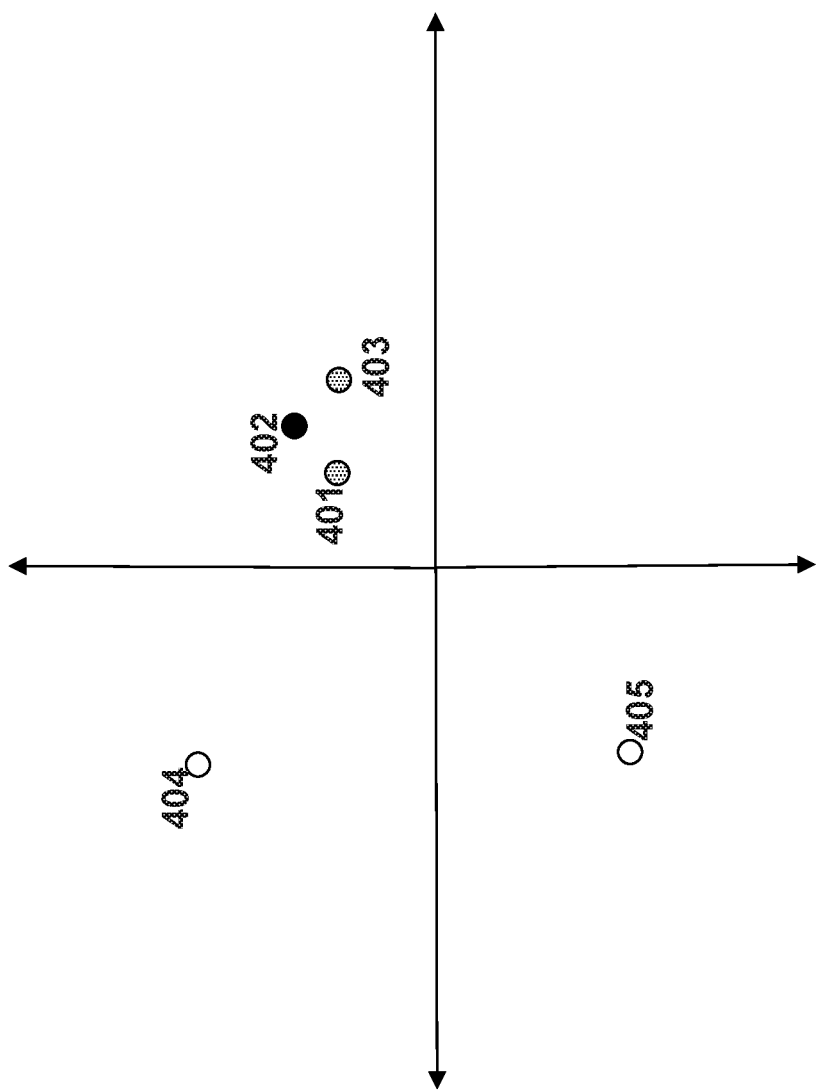

COMPUTER-IMPLEMENTED METHOD FOR DETECTING FRAUDULENT TRANSACTIONS USING LOCALITY SENSITIVE HASHING AND LOCALITY OUTLIER FACTOR ALGORITHMS

TECHNICAL FIELD

The present disclosure generally relates to computerized systems and methods for detecting fraudulent data points in a database of such systems. Embodiments of the present disclosure relate to inventive and unconventional systems for detecting fraudulent data points, such as fraudulent transactions, by using Locality Sensitive Hashing and Local Outlier Factor algorithms on such systems.

BACKGROUND

With the proliferation of the Internet, more and more users are using it to purchase goods. As the scope and volume of electronic transactions continues to grow, systems and methods were developed to detect fraudulent transactions. However, fraudulent transactions evolved as the detection methods and systems developed. The fraudulent transactions shifted in different forms exhibiting totally different patterns.

Conventional methods and systems emphasize on detecting an anomaly among non-anomalies by using static rules. The systems first identify at least one anomaly and then write rules to detect the anomaly. The rules may be identified using pattern mining techniques. Assumptions on the static rules are that most anomalies belong to few anomaly types, thus the systems may detect most anomalies by finding few static rules that describe those anomaly types. However, the static rules may not detect anomalies that exhibit different patterns to evade the rules.

Therefore, there is a need for improved methods and systems for detecting a fraudulent data point in electronic transactions.

SUMMARY

One aspect of the present disclosure is directed to a system including a memory storing instructions and at least one processor programmed to execute the instructions to perform a method for detecting a fraudulent data point using Locality Sensitive Hashing and Local Outlier Factor algorithms. The method includes receiving, from a user device, a request for detecting one or more fraudulent data points, constructing a feature vector for all data points in a database, wherein the data points represent electronic transactions including attributes, and constructing locality sensitive hashing tables for the constructed feature vectors, each hashing table including at least one cell containing data points with identical hash values computed independently, wherein each data point is represented by a neighbor data point in the identical cell. The method further includes assigning a best neighbor data point for each data point, wherein the best neighbor data point was most frequently placed in same cell with the data point in the constructed hashing tables, computing outlier scores for each data point by applying a modified local outlier factor algorithm on the assigned best neighbor data point associated with each data point, and detecting a fraudulent data point based on the computed outlier scores.

Another aspect of the present disclosure is directed to a method for detecting a fraudulent data point using a combination of Locality Sensitive Hashing and Local Outlier Factor algorithms. The method includes receiving, from a user device, a request for detecting one or more fraudulent data points, constructing a feature vector for all data points in a database, wherein the data points represent electronic transactions including attributes, and constructing locality sensitive hashing tables for the constructed feature vectors, each hashing table including at least one cell containing data points with identical hash values computed independently, wherein each data point is represented by a neighbor data point in the identical cell. The method further includes assigning a best neighbor data point for each data point, wherein the best neighbor data point was most frequently placed in same cell with the data point in the constructed hashing tables, computing outlier scores for each data point by applying a modified local outlier factor algorithm on the assigned best neighbor data point associated with each data point, and detecting a fraudulent data point based on the computed outlier scores.

Yet another aspect of the present disclosure is directed to a non-transitory computer-readable storage medium that comprises instructions that may be executed by a processor to perform a method for detecting a fraudulent data point using a combination of Locality Sensitive Hashing and Local Outlier Factor algorithms. The method includes receiving, from a user device, a request for detecting one or more fraudulent data points, constructing a feature vector for all data points in a database, wherein the data points represent electronic transactions including attributes, and constructing locality sensitive hashing tables for the constructed feature vectors, each hashing table including at least one cell containing data points with identical hash values computed independently, wherein each data point is represented by a neighbor data point in the identical cell. The method further includes assigning a best neighbor data point for each data point, wherein the best neighbor data point was most frequently placed in same cell with the data point in the constructed hashing tables, computing outlier scores for each data point by applying a modified local outlier factor algorithm on the assigned best neighbor data point associated with each data point, and detecting a fraudulent data point based on the computed outlier scores.

Other systems, methods, and computer-readable media are also discussed herein.

BRIEF DESCRIPTION OF THE DRAWINGS

FIGS. 4A, 4B, 4C, 4D, 4E, and 4F are sample transaction data points, consistent with the disclosed embodiments.

DETAILED DESCRIPTION

Figure 1A:
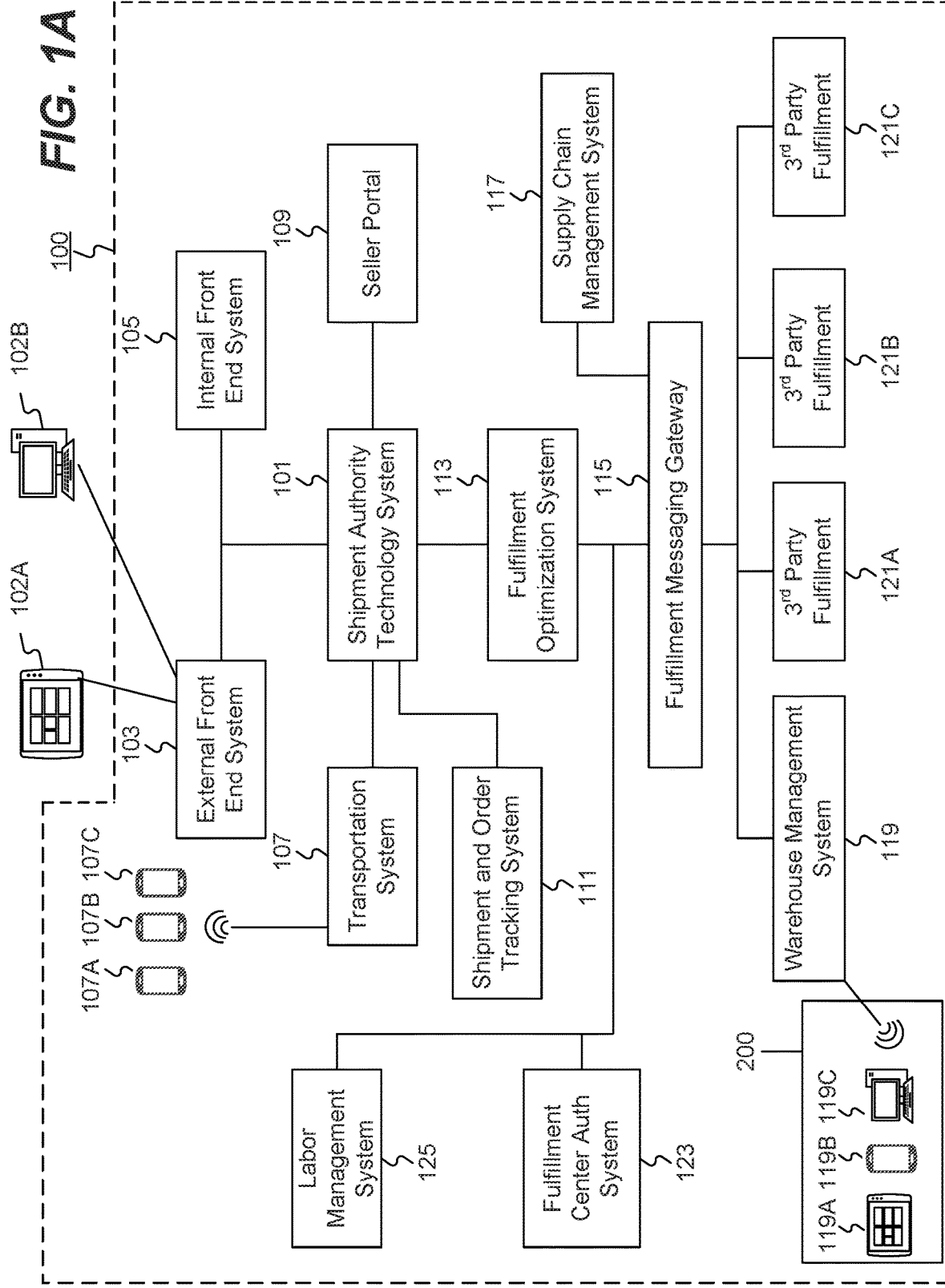
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods, or by performing non-dependent steps in parallel with each other. Accordingly, the following detailed description is not limited to the disclosed embodiments and examples. Instead, the proper scope of the invention is defined by the appended claims.

Embodiments of the present disclosure are directed to computer-implemented systems and methods configured for detecting fraudulent data points by using a combination of Locality Sensitive Hashing and Local Outlier Factor algorithms. The disclosed embodiments provide innovative technical features that allow users to detect a fraudulent data point by learning reliable behavior. Unlike fraudulent behaviors, a reliable behavior does not change over time. Thus, data points representing the reliable behavior have consistent spatial arrangements under different groupings. For example, the disclosed embodiments compute an outlier score for each data point representing consistency among the data points and detect a fraudulent data point by choosing a data point associated with an outlier score with inconsistent degrees.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
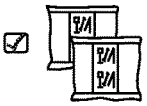
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3 PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
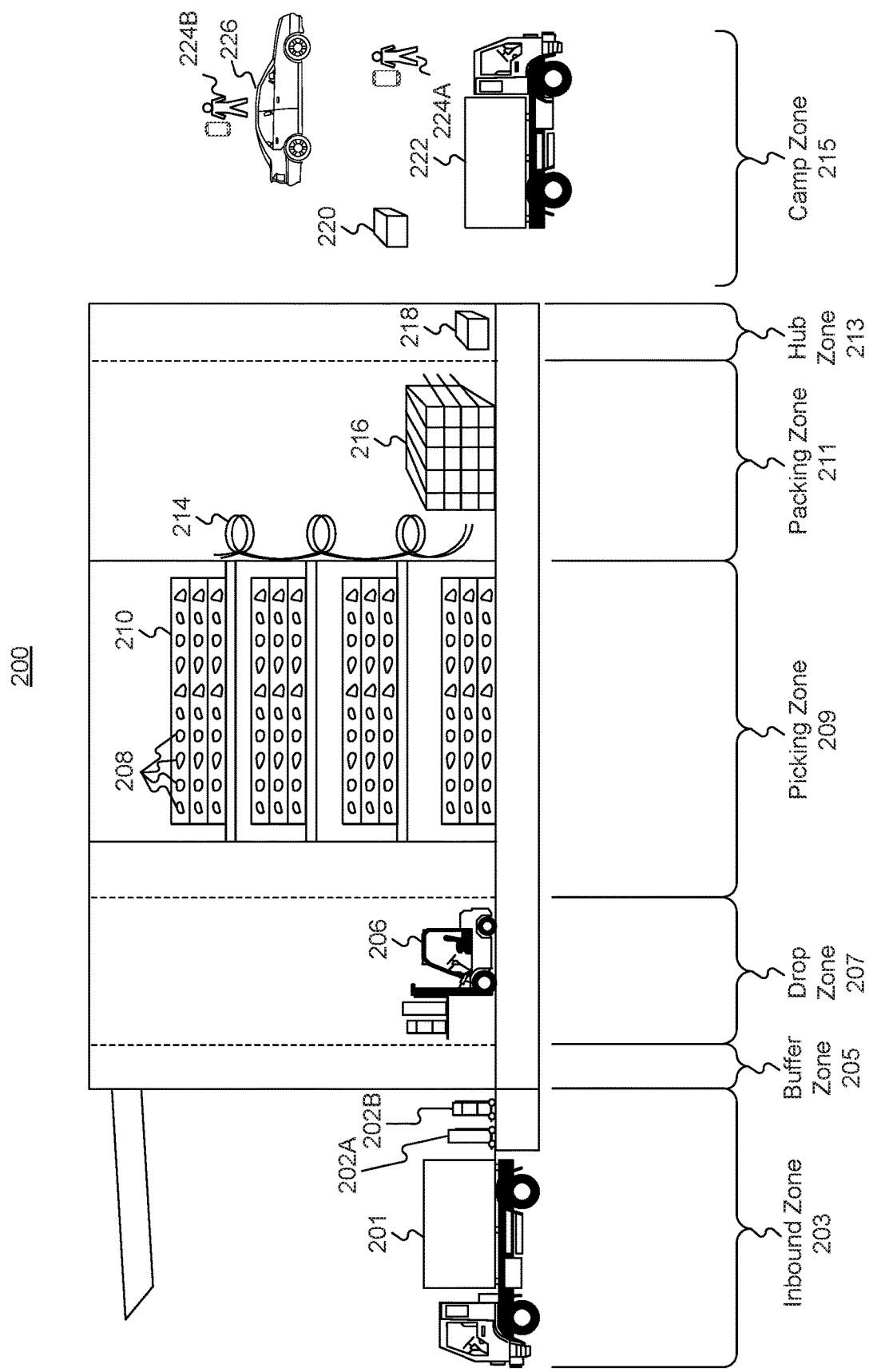
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to an aspect of the present disclosure, a computer-implemented system for detecting fraudulent data points using a combination of Locality Sensitive Hashing algorithm (LSH) and a local outlier factor algorithm (LOF) may comprise one or more memory devices storing instructions, and one or more processors configured to execute the instructions to perform operations. The fraudulent data points may include, but not limited to, fraudulent payments, account takeovers, fraudulent resales, and a buyer entity fraud. Fraudulent payments may refer to any type of false or illegal transaction performed by an unauthorized individual. Account takeover may refer to a form of identity theft where a fraudster or other unauthorized individual illegally gets access to a victim's bank or online e-commerce account using bots. A successful account takeover attack may lead to fraudulent transactions and unauthorized shopping from the victim's compromised account. The resale may refer to any type of activities by fraudsters or other unauthorized individuals to resell stolen goods. Buyer entity fraud may refer to any type of activities by fraudsters or other unauthorized individuals using a fraudulent entity (e.g., a fake identity) to purchase goods. In some embodiments, the disclosed functionality and systems may be implemented as part of internal front end system 105. The preferred embodiment comprises implementing the disclosed functionality and systems on internal front end system 105, but one of ordinary skill will understand that other implementations are possible.

Figure 3A:
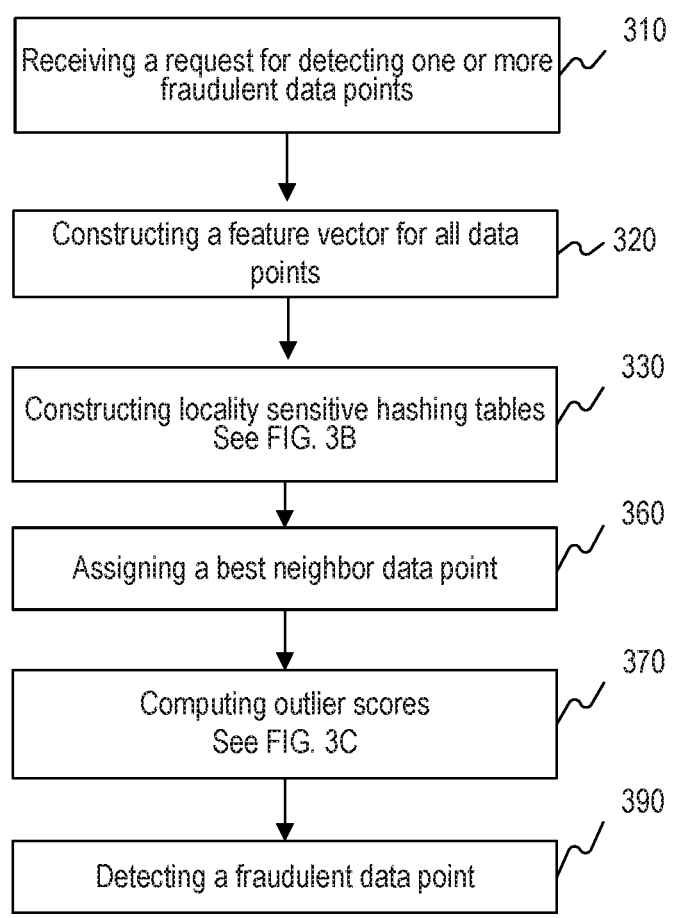
FIG. 3A shows an exemplary method for detecting fraudulent data points using a combination of Locality Sensitive Hashing and Local Outlier Factor algorithms on internal front end system, consistent with the disclosed embodiments.

FIG. 3A shows an exemplary method 300 for detecting fraudulent data points using a combination of LSH and LOF on internal front end system 105. The method or a portion thereof may be performed by internal front end system 105. For example, the system may include one or more processors and a memory storing instructions that, when executed by the one or more processors, cause the system to perform the steps shown in FIG. 3A.

In step 310, internal front end system 105 may receive a request for detecting one or more fraudulent data points from a user device (not pictured) associated with an internal user. As discussed above, internal front end system 105 may be implemented as a computer system that enables internal users (e.g., employees of an organization that owns, operates, or leases system 100) to interact with one or more systems in system 100 as discussed above with respect to FIG. 1A. For example, external front end system 105 may receive a user input (e.g., from a button, keyboard, mouse, pen, touchscreen, or other pointing device) from a user device requesting detecting one or more fraudulent data points stored in a database (not pictured). Internal front end system 105, as discussed above with respect to FIG. 1A, may include one or more of a web caching system, a database, a search system, a payment system, an analytics system, an order monitoring system, or the like and store data points associated with transactions in the database. For example, a data point may represent an electronic transaction that includes a merchant ID, a transaction date, an average amount/transaction/day, a transaction amount, a type of transaction, a risk-level of transaction, and a daily chargeback average amount. Internal front end system 105 may modify the data points in the database by automatic audit system.

In step 320, internal front end system 105 may construct a feature vector for all data points. Internal front end system 105 may access a database storing points and extract attributes of data points. Attributes, also called features or variables, may characterize the data points. Based on the extracted attributes, internal front end system 105 may classify data points as either normal or abnormal. The attributes of data points may include, but not limited to, a merchant ID, a transaction date, an average amount per transaction or day, a transaction amount, a type of transaction, a risk level of transaction, and an average daily chargeback amount. Internal front end system 105 may scale the extracted attributes to numerical values. Internal front end system 105 may convert the scaled attributes into a feature vector for use in computing a dot product with a random vector (e.g., as in step 341 in FIG. 3B, discussed below). For example, as shown in FIG. 4A, two-dimensional data points 401, 402, 403, 404, and 405 are represented as scattered Cartesian coordinates. The data points are displayed as a collection of points, each having the value of one variable determining the position on the x-axis, and the value of the other variable determining the position on the y-axis. For example, the x-axis may represent one of the extracted and scaled attributes, a type of transaction, and the y-axis may represent the other extracted and scaled attribute, a transaction amount. The two-dimensional data points 401, 402, 403, 404, and 405 are constructed into a feature vector to compute a dot product with a random vector. For example, internal front end system 105 may convert data point 401 as a two-dimensional vector (1,1) because it has x-component 1 and y-component 1. Similarly, internal front end system 105 may represent data point 402 as (1.5, 1.5), data point 403 as (2, 1), data point 404 as (−2, 2.5), and data point 405 as (−2, −2). The compute is discussed below in respect to step 341 in FIG. 3B. While FIG. 4A is described with respect to two-dimensional data points, one of ordinary skill in the art will recognize that multi-dimensional data points may be used for detecting fraudulent data points.

The data points may be retrieved from one or more databases kept by one or more systems. For example, the data points may include data generated by, e.g., Fulfilment Optimization system 113 in association with fulfilling orders placed by a customer. The data may additionally or alternatively include data generated by, e.g., SAT system 101 in association with monitoring the order and delivery status of customer orders. In some embodiments, the transaction data may include a transaction ID that uniquely identifies each transaction in the system and some or all of the remaining data items may be retrieved from appropriate databases via one or more database queries based on the transaction ID.

Figure 3B:
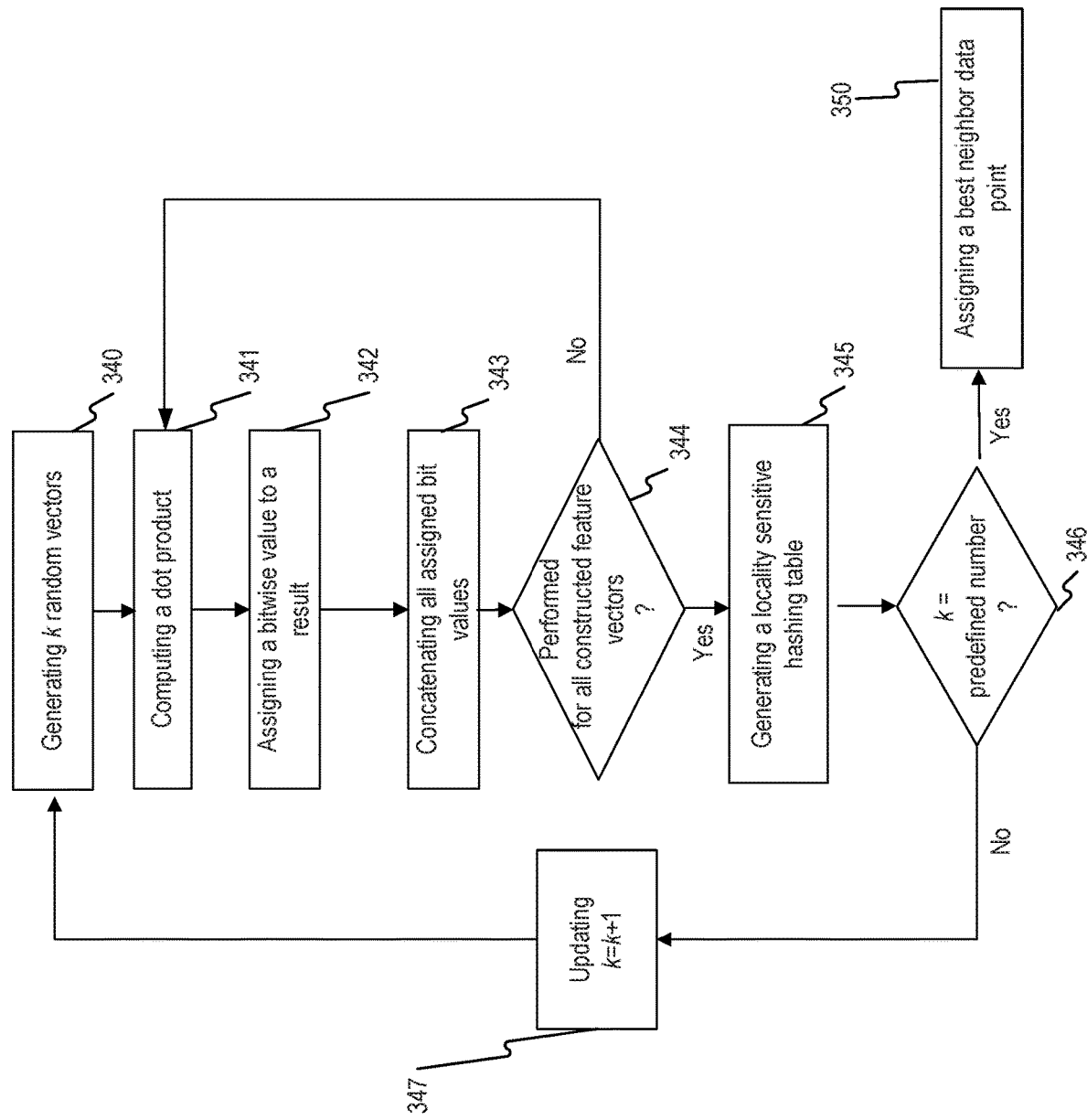
FIG. 3B shows an exemplary method for constructing locality sensitive hashing tables, consistent with the disclosed embodiments.
Figure 4B:
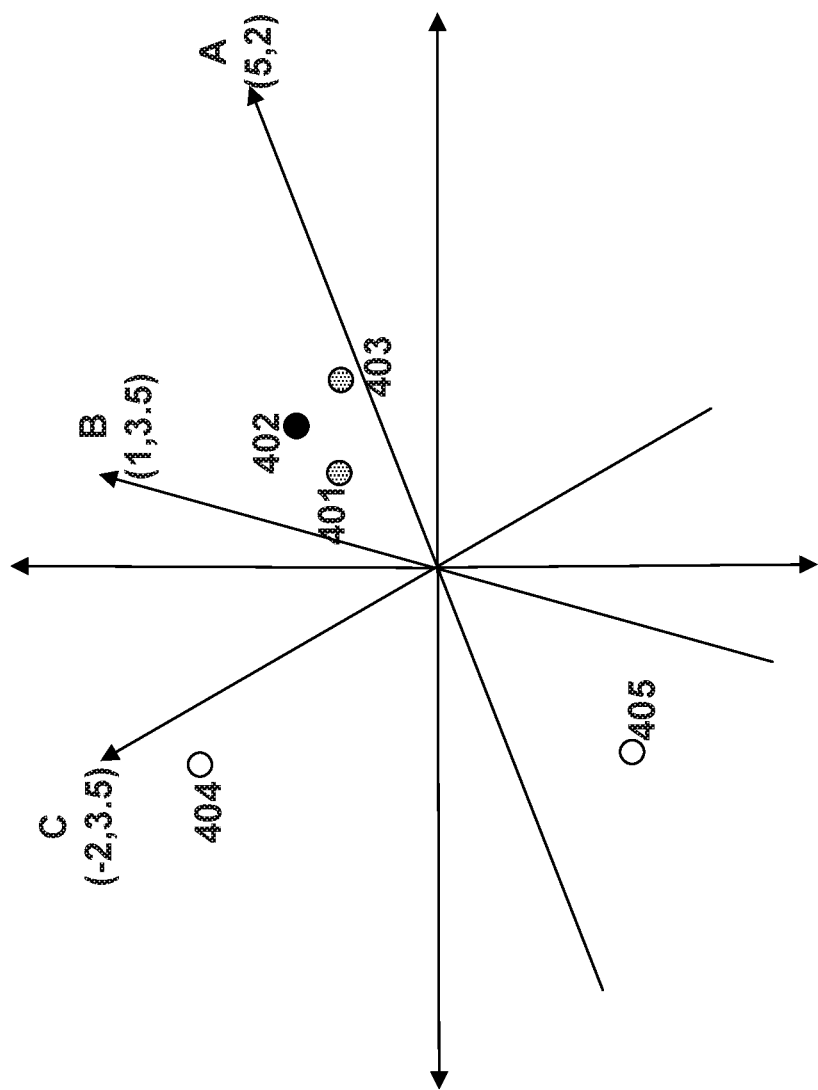

Step 330 is further described with respect to step 340 in FIG. 3B. In step 340 (FIG. 3B), internal front end system 105 may generate k random vectors of length d each, wherein k is the size of bitwise hash value and d is the dimension of the constructed feature vector. For example, as shown in FIG. 4B, internal front end system 105 may generate three (k) two-dimensional (d) vectors A, B, and C in Cartesian coordinates. Vector A(5,2) is represented by its x-component of 5 and a y-component of 2, Vector B(1,3.5) is represented by its x-component of 1 and a y-component of 3.5, and Vector C(−2,3.5) is represented by its x-component of −2 and a y-component of 3.5.

In step 341, internal front end system 105 may compute a dot product of the generated random vectors and the data points represented by constructed feature vectors. For example, internal front end system 105 may compute a dot product of Vector A(5,2) and data point 401 (1,1) and the result of the computation is 7. The computation of the dot product is performed by (x-component of random vector times x-component of feature vector)+(y-component of random vector times y-component of feature vector). By way of further example, internal front end system 105 may compute a dot product of data point 401 and Vector B(1,3.5) and C(−2,3.5), wherein the result is 4.5 and 1.5 respectively.

Figure 4C:
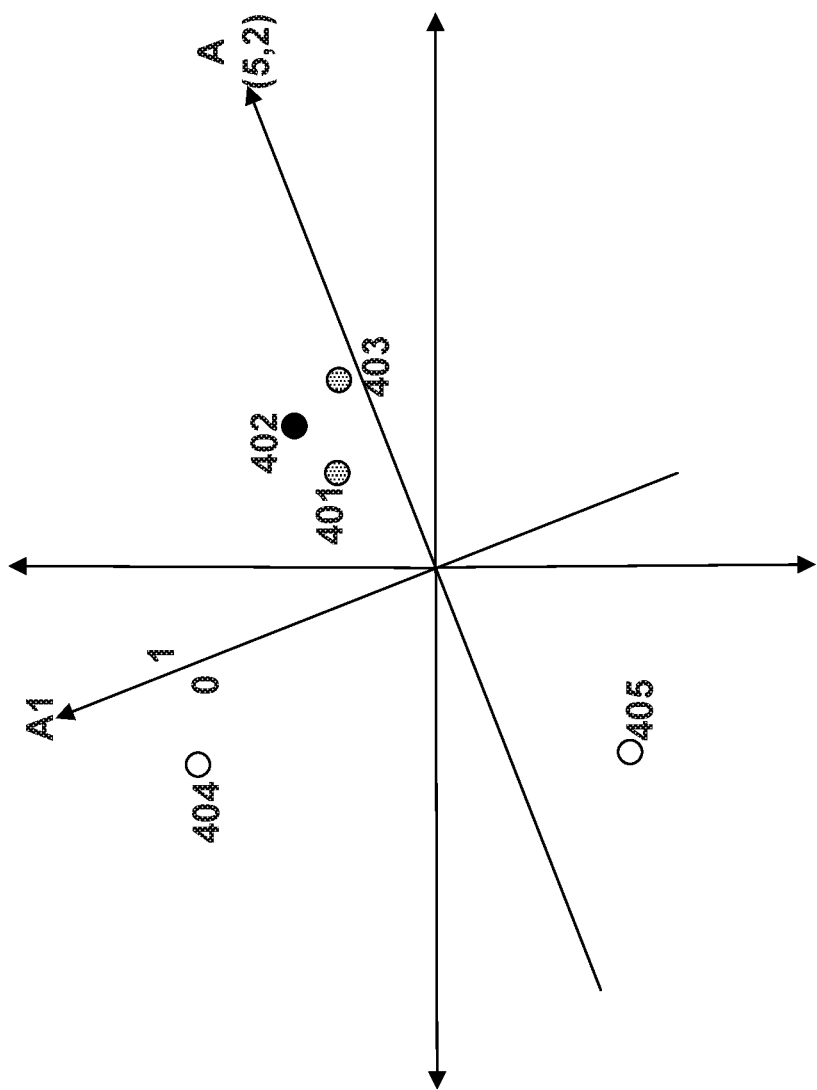
Figure 4D:
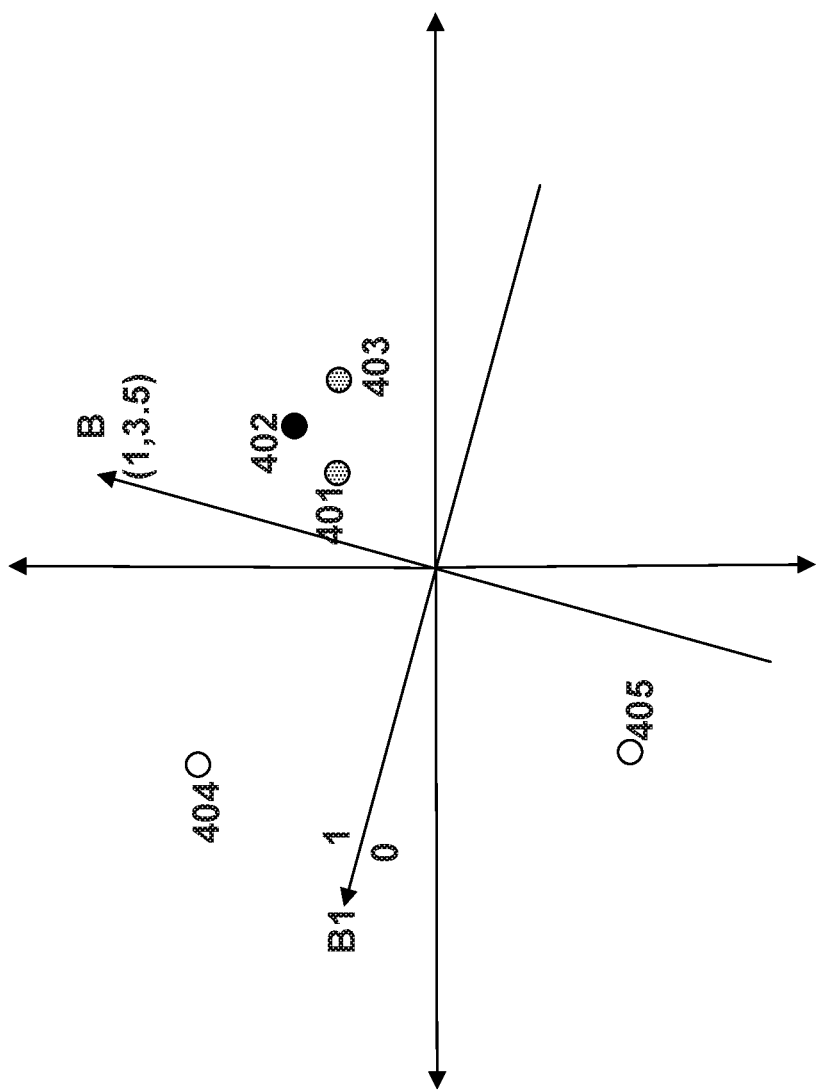
Figure 4E:
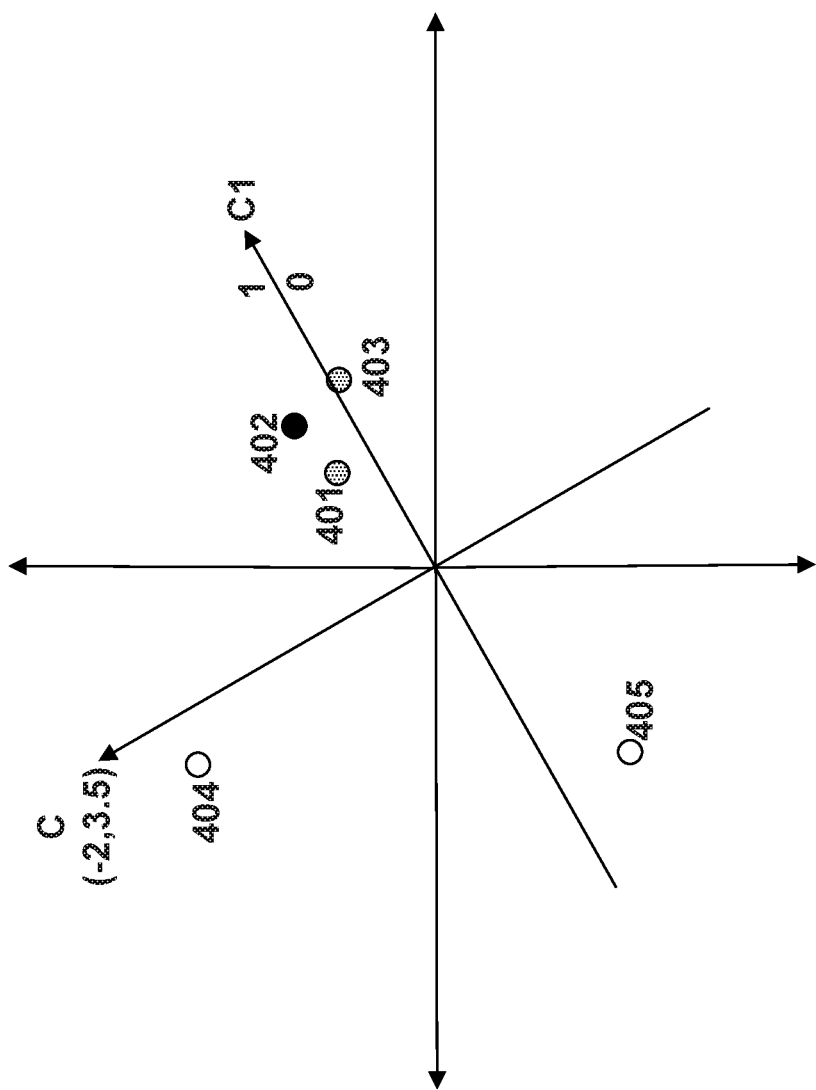

In step 342, internal front end system 105 may assign a bitwise value to the result of the dot product from step 341. If the result of the dot product is positive, internal front end system 105 may assign the bit value as 1, otherwise, the system may assign 0. For example, as shown in FIG. 4C, internal front end system 105 may assign 1 to data point 401 which has the positive dot product result (7 as computed in step 341). FIG. 4C may present Vector A1, which is perpendicular to Vector A. Vector A1 may divide data points with assigned bit value 1 or 0. From FIG. 4C, bit value 1 is assigned to data points 401, 402, and 403 as they are on the right side of Vector A1 and bit value 0 is assigned to data points 404 and 405 as they are on the left side of Vector A1. Similarly, FIG. 4D shows bit value 1 is assigned to data points 401, 402, 403, and 404, and bit value 0 is assigned to data points 405, and FIG. 4E shows bit value 1 is assigned to data points 401, 402, and 404, and bit value 0 is assigned to data points 403 and 405.

In step 343, internal front end system 105 may concatenate all assigned bit values. For example, internal front end system 105 may concatenate bit values assigned in step 342 for data point 401. The system may assign 1, a result of the dot product between Vector A and data point 401, to least significant bit, the left-most bit. By way of further example, internal front end system 105 may assign all assigned bit values in computed order, thus $k^{th}$ assigned bit value will be assigned to most significant bit, the right-most bit. The result of concatenation for data point 401 is 111, which represents a hash value.

In step 344, internal front end system 105 may determine whether a dot product computation, a bitwise value assignment, and a concatenation have been performed for all constructed feature vectors from step 320. If the above steps are not performed for all constructed feature vectors, internal front end system 105, in step 341, may compute a dot product for unperformed constructed feature vectors. If the above steps are performed for all constructed feature vectors, internal front end system 105, in step 345, may generate a locality sensitive hashing table. When the hashing table is generated, internal front end system 105 may assign data points with the same concatenated bit values (hash values) from step 343 in a cell in the generated hashing table. For example, as shown in FIG. 4E, data points 401 and 402 are assigned to a cell representing hash value 111, data point 403 is assigned to a cell representing hash value 011, data point 404 is assigned to a cell representing hash value 110, and data point 405 is assigned to a cell representing hash value 000 in a generated hashing table, Table 1.

In step 346, internal front end system 105 may determine whether k, representing a number of random vectors, is equal to a predefined number. If k is not equal to the predefined number, the system, in step 346, may update the k by k=k+1. More locality sensitive hashing tables will be generated from this process and data points will be assigned to cell in the hashing tables based on recently assigned hash values. If the k is equal to the predefined number, the system, in step 350 (corresponding to step 360 in FIG. 3A), may assign a best neighbor data point for each data point. The best neighbor data point is most frequently placed in same cell with the data point in the constructed hashing tables. For example, for data point 401, data point 402 is assigned as a best neighbor data point as both data points 401 and 402 are placed in cell 111 in a hashing table, Table 1.

Figure 3C:
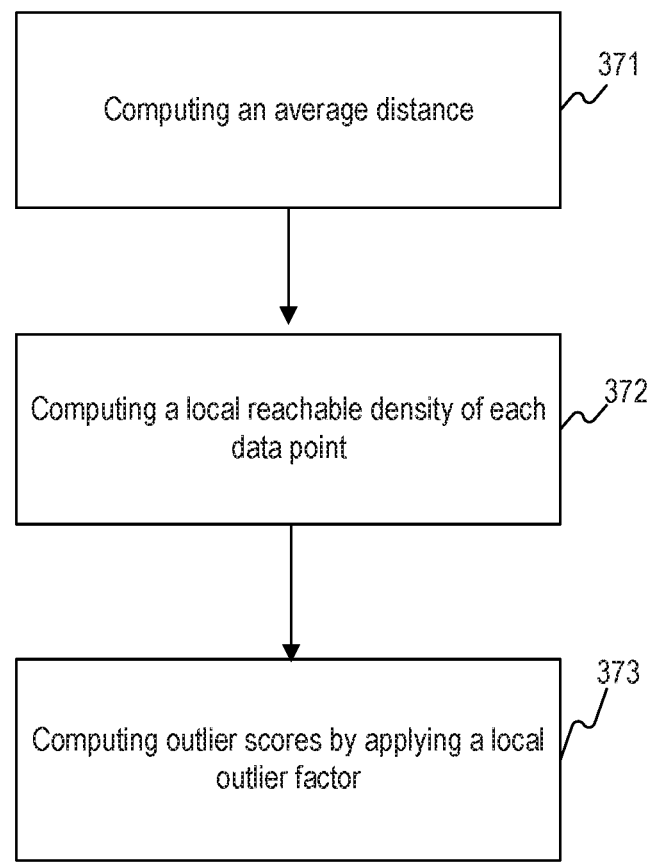
FIG. 3C shows an exemplary method for computing an outlier score for each data point using a Local Outlier Factor algorithm, consistent with the disclosed embodiments.

After step 360 in FIG. 3A, the process moves to step 371 in FIG. 3C. In step 371, internal front end system 105 may compute an average distance between a data point and its assigned best neighbor data points. For example, for data point 401, internal front end system 105 may compute an average distance between data point 401 and data point 402, the best neighbor data point.

Figure 4F:
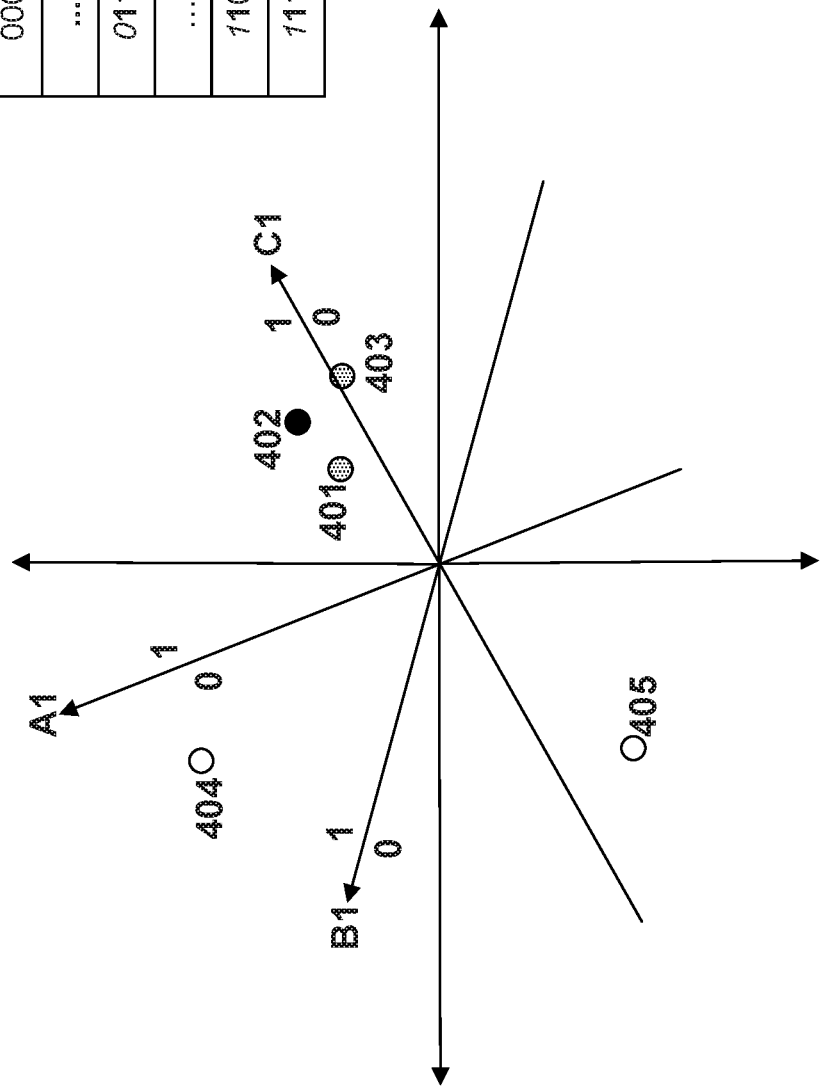

In step 372, internal front end system 105 may compute a local reachable density of each data point. The local reachable density tells how far a point must travel to reach the next point or cluster of points. The algorithm to compute a local reachable density is:

$$\mathrm{lrd\_k[data\ point]} = 1 / \left( \frac{\sum_{\mathrm{best\ neighbor\ data\ points} \in \mathrm{result[data\ point]}} \mathrm{k\_distance[best\ neighbor\ data\ points]}}{\mathrm{size\ of\ result[data\ point]}} \right),$$

where $\Sigma_{\mathrm{best\ neighbor\ data\ points} \in \mathrm{result[data\ point]}}$ k_distance [best neighbor data points] aggregates all k-distance[best neighbor data points] (computed in step 371) for all best neighbor data points and the size of result[point] may refer to number of neighbors. For example, the size of result[401] is 1 (data point 402) according to Table 1 in FIG. 4F.

In step 373, internal front end system 105 may compute outlier scores for each data point by applying a local outlier factor. The algorithm to compute an outlier score is $$\mathrm{LOF\_k[data\ point](Outlier\ Score)} = \frac{\frac{\sum_{\mathrm{best\ neighbor\ data\ points} \in \mathrm{result[data\ point]}} \mathrm{lrd\_k[best\ neighbor\ data\ points]}}{\mathrm{lrd\_k[data\ point]}}}{\mathrm{size\ of\ result[data\ point]}},$$

where $\Sigma_{\mathrm{best\ neighbor\ data\ points} \in \mathrm{result[point]}} \frac{\mathrm{lrd\_k[best\ neighbor\ data\ points]}}{\mathrm{led\_k[data\ point]}}$ computes local reachable densities for all best neighbor data points associated with a data point, aggregate the computed local reachable densities, and divide the aggregated densities by the computed locality density for the data point computed in step 372.

After step 373, the process moves back to FIG. 3A. In step 390 (FIG. 3A), internal front end system 105 may detect a fraudulent data point based on the outlier scores computed in step 372. The outlier scores may indicate whether a data point is fraudulent if the outlier score of one data point falls below a predefined degree of consistency. Exemplary fraudulent data points 404 and 405 are shown in FIGS. 4A-F. For example, internal front end system 105 may determine fraudulent data points 404 and 405 when outlier scores of the data points fall below bottom 95 percent.

In some embodiments, internal front end system 105, after detecting a fraudulent data point, may blacklist a buyer/seller associated with an electronic transaction associated with the detected fraudulent data point. In some embodiments, the blacklisted buyer/seller may not make any electronic transactions until internal front end system 105 delist the blacklisted buyer/seller from the blacklist.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented method comprising:
   receiving, from a user device, a request for detecting one or more fraudulent data points;
   extracting attributes from data points in a database, wherein the data points represent electronic transactions and are generated to include:
     fulfilling orders placed by customers, and
     monitoring order and delivery statuses of the orders placed by the customers;
   constructing a feature vector for the data points in the database using the extracted attributes, wherein the extracted attributes comprise a merchant id, a transaction date, an average amount/transaction/day, a transaction amount, a type of transaction, a risk-level of transaction, and a daily chargeback average amount;
   constructing locality sensitive hashing tables for the constructed feature vectors, each hashing table including at least one cell containing data points with identical hash values computed independently, wherein each data point is represented by a neighbor data point in the identical cell;
   wherein constructing locality sensitive hashing tables comprises:
     generating k random vectors, wherein a dimension of the vectors corresponds to a dimension of the data points;
     computing a dot product of the k random vectors and the constructed feature vector;
     assigning 1 to a result of the computed dot product if the result is positive, otherwise assigning 0 to the result,
       wherein bit values are assigned to the result of the computed dot product in order from most significant data point to least significant data point,
     wherein bit values are assigned to the result of the computed dot product in order from most significant data point to least significant data point, wherein each data point is associated with an attribute;
   assigning a best neighbor data point for each data point associated with an attribute, wherein the best neighbor data point was most frequently placed in same cell with the data point in the constructed hashing tables;
   computing outlier scores for each data point associated with an attribute by applying a modified local outlier factor algorithm on the assigned best neighbor data point associated with each data point, the computation comprises:
     computing an average distance between each data point and all of its neighbor data points,
     computing a local reachable density of each data point based on the computed average distance, and
     computing outlier scores by applying a local outlier factor on the computed local reachable density for each data point;
   determining that the computed outlier scores fall below a predefined degree of consistency;
   detecting fraudulent data points based on the determination that the computed outlier scores fall below the predefined degree of consistency, wherein the fraudulent data points are selected from a group comprising fraudulent payments, account takeovers, resales, and buyer entity fraud in association with the generated data points; and
   blacklisting a user related to an electronic transaction associated with the detected fraudulent data points.

2. The method of claim 1, wherein constructing locality sensitive hashing tables further comprises:
   concatenating all the bit values computed for k dot products;
   repeating the operations of computing a dot product for all constructed feature vectors, assigning a bitwise value, and concatenating all the bit values to compute hash values for all constructed feature vectors; and
   generating a locality sensitive hashing table by grouping data points, associated with the feature vectors, with the same hash values and placing the grouped data points in a cell,
   wherein the steps of generating k random vectors, computing a dot product, assigning a bitwise value, concatenating all the bit values, repeating the operations, and generating a table are repeatedly performed for fixed number of iterations and k is updated by adding 1 to k for each iteration.

3. The method of claim 1, wherein the computed outlier scores close to 1 indicate high consistency and the computed outlier scores close to 0 indicate low consistency.

4. The method of claim 1, wherein the extracted attributes are scaled to numerical values.

5. The method of claim 1, wherein the feature vector is multidimensional.

6. The method of claim 1, wherein the operations further comprise modifying the data points in the database by automatic audit system.

7. A computer-implemented system comprising:
   one or more memory devices storing instructions;
   one or more processors configured to execute the instructions to perform operations comprising:
     receiving, from a user device, a request for detecting one or more fraudulent data points;
     extracting attributes from data points in a database, wherein the data points represent electronic transactions and are generated to include:
       fulfilling orders placed by customers, and
       monitoring order and delivery statuses of the orders placed by the customers;
     constructing a feature vector for the data points in the database using the extracted attributes, wherein the extracted attributes comprise a merchant id, a transaction date, an average amount/transaction/day, a transaction amount, a type of transaction, a risk-level of transaction, and a daily chargeback average amount;

constructing locality sensitive hashing tables for the constructed feature vectors, each hashing table including at least one cell containing data points with identical hash values computed independently, wherein each data point is represented by a neighbor data point in the identical cell;

wherein constructing locality sensitive hashing tables comprises:

generating k random vectors, wherein a dimension of the vectors corresponds to a dimension of the data points;

computing a dot product of the k random vectors and the constructed feature vector;

assigning 1 to a result of the computed dot product if the result is positive, otherwise assigning 0 to the result, wherein bit values are assigned to the result of the computed dot product in order from most significant data point to least significant data point, wherein each data point is associated with an attribute;

assigning a best neighbor data point for each data point associated with an attribute, wherein the best neighbor data point was most frequently placed in same cell with the data point in the constructed hashing tables;

computing outlier scores for each data point associated with an attribute by applying a modified local outlier factor algorithm on the assigned best neighbor data point associated with each data point, the computation comprises:

computing an average distance between each data point and all of its neighbor data points, computing a local reachable density of each data point based on the computed average distance, and computing outlier scores by applying a local outlier factor on the computed local reachable density for each data point;

determining that the computed outlier scores fall below a predefined degree of consistency;

detecting fraudulent data points based on the determination that the computed outlier scores fall below the predefined degree of consistency, wherein the fraudulent data points are selected from a group comprising fraudulent payments, account takeovers, resales, and buyer entity fraud in association with the generated data points; and blacklisting a user related to an electronic transaction associated with the detected fraudulent data points.

8. The computer-implemented system of claim 1, wherein constructing locality sensitive hashing tables further comprises:

concatenating all the bit values computed for k dot products;

repeating the operations of computing a dot product for all constructed feature vectors, assigning a bitwise value, and concatenating all the bit values to compute hash values for all constructed feature vectors; and generating a locality sensitive hashing table by grouping data points, associated with the feature vectors, with the same hash values and placing the grouped data points in a cell, wherein the steps of generating k random vectors, computing a dot product, assigning a bitwise value, concatenating all the bit values, repeating the operations, and generating a table are repeatedly performed for fixed number of iterations and k is updated by adding 1 to k for each iteration.

9. The computer-implemented of claim 8, wherein the computed outlier scores close to 1 indicate high consistency and the computed outlier scores close to 0 indicate low consistency.

10. The computer-implemented system of claim 8, wherein the extracted attributes are scaled to numerical values.

11. The computer-implemented system of claim 8, wherein the feature vector is multidimensional.

12. The computer-implemented system of claim 8, wherein the operations further comprise modifying the data points in the database by automatic audit system.

* * * * *